United States Patent [19]

Nicholas et al.

[11] Patent Number: 5,658,465
[45] Date of Patent: Aug. 19, 1997

[54] METHOD FOR INHIBITING THE DEPOSITION OF SILICA AND SILICATE COMPOUNDS IN WATER SYSTEMS

[75] Inventors: Paul Peter Nicholas, Broadview Heights; Zahid Amjad, Brecksville, both of Ohio

[73] Assignee: The B.F. Goodrich Company, Richfield, Ohio

[21] Appl. No.: 579,694

[22] Filed: Dec. 28, 1995

[51] Int. Cl.$^6$ ..................................................... C02F 5/12
[52] U.S. Cl. .......................... 210/698; 210/699; 210/701; 252/180; 422/16; 422/17
[58] Field of Search .................................. 210/698–701; 252/180, 181; 422/16, 17

[56] References Cited

U.S. PATENT DOCUMENTS

| | | | |
|---|---|---|---|
| 4,328,106 | 5/1982 | Harrar et al. | 210/700 |
| 4,532,047 | 7/1985 | Dubin | 210/698 |
| 4,566,973 | 1/1986 | Masler et al. | 210/701 |
| 4,711,725 | 12/1987 | Amick et al. | 210/701 |
| 5,078,879 | 1/1992 | Gill et al. | 210/701 |
| 5,271,847 | 12/1993 | Chen et al. | 210/697 |
| 5,271,862 | 12/1993 | Freese | 252/181 |
| 5,277,823 | 1/1994 | Hann et al. | 210/698 |
| 5,346,626 | 9/1994 | Momozaki et al. | 210/701 |
| 5,422,010 | 6/1995 | Carey et al. | 210/701 |

*Primary Examiner*—Peter A. Hruskoci
*Attorney, Agent, or Firm*—George W. Moxon II

[57] ABSTRACT

The present invention relates to a method for inhibiting the formation and deposition of silica and silicate compounds in water systems by the use an effective amount of a polymer or copolymer having the following structure:

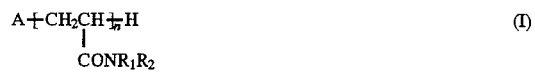

or

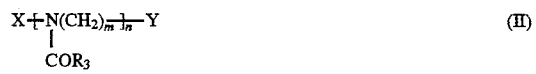

wherein A is the initiator radical from free radical polymerization, such as for example, alkoxy, acyloxy, hydroxyl, alkyl or sulfonate radicals from peroxide initiators, or cyanoalkyl radicals from azonitrile initiators, or n-alkythio or tetrahydrofuranyl radicals from common transfer agents, $R_1$ and $R_2$ are alkyl groups which contain a combined total of 2 to 4 carbon atoms or $R_1$ and $R_2$ together with the nitrogen atom comprise a ring containing 3 to 5 carbon atoms, $R_3$ is either H or a $C_1$ through $C_4$ alkyl, X is selected from the group consisting of hydrogen, an n-alkyl or aralkyl chain containing up to 30 carbon atoms, and an isoalkyl chain containing 3 to 30 carbon atoms, Y an oxazolinium salt, a 1,3- oxazolinium salt, or a neutral end group derived from simple nucleophiles, m is 2 or 3, and n is an integer between 10 and 1000, which polymers may be used alone or in concert with other water treating agents, e.g. phosphoric acids and their salts, phosphonic acids and their salts, metal chelating agents, corrosion inhibitors, oxygen scavengers, homo- and copolymers of acrylic acid, homo- and copolymers of maleic acid or anhydride, and acrylic acid/maleic acid based copolymers.

30 Claims, No Drawings

METHOD FOR INHIBITING THE DEPOSITION OF SILICA AND SILICATE COMPOUNDS IN WATER SYSTEMS

BACKGROUND OF THE INVENTION

The present invention relates to a method for inhibiting the formation and deposition of silica and silicate compounds in water systems with certain polymers containing fully substituted amide functional groups.

In many parts of the world, including Western United States, Mexico, and Southeast Asia, the efficient use of water in cooling, boiler, geothermal, and reverse osmosis applications is limited by the solubility of silica. Water supplies in these areas can have silica levels of from 30 to 120 parts per million (ppm). Water treatment operations are limited because the solubility of silica at about 150 ppm can be exceeded when minerals are concentrated during processing. This can result in the precipitation and deposition of amorphous silica and silicates with consequential loss of equipment efficiency.

The accumulation of silica on internal surfaces of water treatment equipment, such as boilers, cooling, and purification systems reduces heat transfer and fluid flow through heat exchange tubes and membranes. Soluble silica is mainly composed of silicic acid and silicates, in proportions that depend on pH. Insoluble silica originates from base-catalyzed condensation polymerization of soluble silica to produce nominally $SiO_2$. The primary insoluble particle is smaller than 0.1 μm and comprises a core of $SiO_2$ with a surface of silanol groups (Si-OH). The polymerization rate is also pH dependant, with a maximum at about 8.0 to 8.5. However, group II metals, especially Ca, Mg, and Fe are almost always present with silica, and they can influence the rate of scale development. With Mg, for example, highly insoluble "magnesium silicate", can form, especially at pH>8. This scale actually comprises silica particles with magnesium polysilicates on the particle surfaces. The removal of silica scale once it is formed is very difficult and costly. With high silica water, therefore, cooling and reverse osmosis (RO) systems typically operate at low water-use efficiency to assure that the solubility of silica is not exceeded. Under these conditions, RO systems must limit their pure water recovery rate and cooling systems must limit water recycling. In both cases, water discharge volumes are large.

Various additives have been employed to inhibit silica deposition. For example, several compositions based upon acrylic acid copolymers have been taught, such as U.S. Pat. No. 4,711,725 to Amick et al., which teaches acrylic acid copolymerized with acrylamido alkyl or aryl sulfonate, and substituted acrylamide, or U.S. Pat. No. 5,510,159 to Amjad, which teaches acrylic acid copolymerized with dimethyl-diallylammonium chloride and acrylamide. U.S. Pat. No. 4,328,106 to Harrar et al. teaches inhibiting silica scaling and precipitation by injecting low concentrations of cationic nitrogen containing compounds, such as polymeric amines, polymeric imines, and quaternary ammonium compounds. U.S. Pat. No. 4,584,104 to Dubin teaches inhibiting amorphous silica scale formation by treating industrial waters with a boron compound which dissolves in or hydrolyzes in the industrial waters to give the orthoborate ion. U.S. Pat. No. 5,271,847 teaches controlling the deposition of silica by the use of a water soluble graft copolymer of acrylic acid and a polyalkylene glycol ether. U.S. Pat. No. 5,271,862 to Freese teaches inhibiting the deposition of silica and silicate compounds by adding a composition consisting of a hydroxyphosphono-acetic acid and a copolymer of acrylic acid and allyl hydroxypropyl sulfonate ether.

One commercially available polymeric material, namely PowderGuard® RO antiscalant, a powder antiscalant available from Pacific Aquatech Inc., has a suggested use for controlling fouling caused by a variety of sources, including silica; colloids; iron and aluminum hydroxides; barium, strontium, and calcium sulfate; and calcium phosphate and carbonate. Although no compositional information is available concerning PowerGuard® RO antiscalant, it is believed to be or to contain poly(vinyl pyrrolidone).

SUMMARY OF THE INVENTION

The present invention is based on the discovery that certain polymers containing tertiary amide functional groups, such as poly(oxazoline)s, poly(N,N-dialkylacrylamide)s, poly(N-alkyl-N-vinylacetamide)s, and poly (N-acyltrimethyleneimine)s, are remarkably effective inhibitors of soluble silica polymerization and scale development in water systems. More specific examples of these polymers are poly(2-ethyl-2-oxazoline) and poly(N,N-dimethylacrylamide).

The present invention is to the use of a composition for inhibiting the formation and deposition of silica and silicate compounds in water systems where the composition employed includes a polymer or copolymer having the following structure:

or

wherein A is the initiator radical from free radical polymerization, such as, for example, alkoxy, acyloxy, hydroxyl, alkyl or sulfonate radicals from peroxide initiators, or cyanoalkyl radicals from azonitrile initiators, or alkylthio, aralkylthio, carboalkoxyalkylthio, hydroxyalkyl, or tetrahydrofuranyl radicals from common transfer agents, $R_1$ and $R_2$ are alkyl groups which contain a combined total of 2 to 4 carbon atoms or $R_1$ and $R_2$ together with the nitrogen atom comprise a ring containing 3 to 5 carbon atoms, $R_3$ is H or a $C_1$ through $C_4$ alkyl group, X is selected from the group consisting of hydrogen, an alkyl or aralkyl chain containing up to 30 carbon atoms, and substituted or unsubstituted benzyl, Y is an oxazolinium salt, a 1,3-oxazinium salt, or a neutral end group derived from simple neucleophiles, including halogen, hydroxyl, acyloxy, alkoxy, alkylthio, alkylamine, or alkylammonium, m is 2 or 3, and n is an integer between 10 and 1000. These polymers may be used alone or in concert with other water treating agents, e.g. phosphoric acids and their salts, phosphonic acids and their salts, metal chelating agents, corrosion inhibitors, oxygen scavengers, homo- and copolymers of acrylic acid, and homo- and copolymers of maleic acid or anhydride and acrylic acid/maleic acid based polymers.

DETAILED DESCRIPTION OF THE INVENTION

The present invention is a composition and process for inhibiting the deposition of silica and silicate compounds in water systems by employing a polymer or copolymer having an N,N-disubstituted amide functional group. The polymer or copolymer is based upon poly(N,N-dialkylacrylamide)s, poly(2-oxazoline)s, and poly(N-acyltrimethyleneimine)s having the following structures:

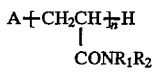

or

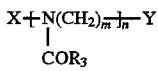

wherein A is the initiator radical from free radical polymerization, such as, for example, alkoxy, acyloxy, hydroxyl, alkyl or sulfonate radicals from peroxide initiators, or cyanoalkyl radicals from azonitrile initiators, or alkythio, aralkylthio, carboalkoxyalkylthio, hydroxyalkyl, or tetrahydrofuranyl radicals from common transfer agents, $R_1$ and $R_2$ are alkyl groups which contain a combined total of 2 to 4 carbon atoms or $R_1$ and $R_2$ together with the nitrogen atom comprise a ring containing 3 to 5 carbon atoms, X is selected from the group consisting of hydrogen, an n-alkyl chain containing 1 to 30 carbon atoms, an isoalkyl chain containing 3 to 30 carbon atoms and substituted or unsubstituted benzyl, $R_3$ is either H or a $C_1$ to $C_4$ alkyl group, Y is an oxazolinium salt having the following formula:

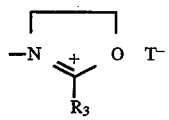

wherein T is selected from the group consisting of p-toluenesulfonate or OTs, $CH_3SO_3$, $ClO_4$, $PF_6$, and $BF_4$, or a 1,3-oxazinium salt, or a neutral end group derived from simple neucleophiles, including halogen, hydroxyl, acyloxy, alkoxy, alkylthio, alkylamine, or alkylammonium, m is 2 or 3, and n is an integer between 10 and 1000.

The polymeric amides (formula I) are prepared by free radical polymerization of the corresponding vinyl monomers, while the polyoxazolines and poly(N-acyltrimethyleneimine)s (formula II) are prepared by living cationic polymerization of the corresponding 2-oxazolines and 1,3-oxazines.

Vinyl monomers which may be employed include N,N-dialkyl-substituted acrylamides, for example, N,N-dimethylacrylamide, N,N-diethylacrylamide, N-acryloylpyrrolidine and the like. The specific vinyl monomer or monomers to be employed are not critical as long as they contain a disubstituted nitrogen atom and produce polymers that are sufficiently water soluble so as to inhibit silica polymerization to the desired degree. In addition, the acrylamide can be copolymerized with a variety of other vinyl monomers such as methyl and ethyl acrylate, acrylic acid, acrylonitrile, or octadecyl acrylate but in amounts that produce water-soluble copolymers as defined. Free radical chain transfer polymerization with mercaptans and other transfer agents can also be employed. Further, there is no criticality in the process of making the polymeric amides in accordance with the present invention.

The polyoxazolines (formula II), m=2 and the poly(N-acyltrimethyleneimine)s (formulla II), m=3 can be made by living cationic polymerization, either by solution polymerization or by bulk polymerization. There is no criticality in the process by which the oxazoline polymer is made. Examples of the 2-oxazoline monomers that can be employed include 2-oxazoline, 2-methyl-2-oxazoline, 2-ethyl-2-oxazoline and the like. Examples of 1,3-oxazines that can be employed include 1,3-oxazine and 2-methyl-1,3-oxazine. In addition, the oxazoline monomers can be copolymerized with various other 2-substituted-2-oxazolines by either random or block (sequential) copolymerization, but in such quantities that the resulting copolymer is water soluble to the degree necessary to inhibit silica polymerization. Examples of such other comonomers include 2-(n-heptadecyl)-2-oxazoline, 2-(n-heptyl)-2-oxazoline, 2-phenyl-2-oxazoline, 2-(4-dodecylphenyl)-2-oxazoline, 2-methoxyethyl-2-oxazoline, 2-perfluoroalkyl-2-oxazoline, and the like. Oxazolines can also be copolymerized with acrylic acid and other electrophilic monomers such as succinic and maleic anyhdride or maleimide to produce alternating copolymer segments in the polyoxazoline chain (S. Kobayashi and T. Saegusa in "Ring-Opening Polymerization"; K. J. Ivin and T. Saegusa, Elsevier, N.Y., 1984, Vol. 2, p. 761; and P.I.C. Guimaraes and A. P. Monteiro, *Polymer Bulletin*, 1995, 34, 393, and references cited). These can be used as silica polymerization inhibitors as long as the resulting polymer is water soluble to the degree necessary. Polymerization can be performed with a variety of cationic initiators that are well known in the art (S. Kobayashi and T. Saegusa in "Ring-Opening Polymerization", K. J. Ivin and T. Saegusa, Elsevier, N.Y., 1984, Vol. 2, p. 761; Q. Liu, M. Konas, and J. S. Riffle, *Macromolecules*, 1993, 26, 5572; S. Kobayashi and T. Saegusa in "Encyclopedia of Polymer Science and Engineering", John Wiley and Sons, New York, Vol. 4, Ed. 2, p. 525). Examples of initiators include methyl tosylate, n-octadecyl tosylate, polyethylene glycol tosylate, benzyl iodide, fluorosulfonic acid, and the like.

The fully substituted amide polymers in accordance with the present invention can be employed per se for the inhibition of silica and silicate formation and/or deposition of silica and/or silicate compounds, or in combination with other water treating agents, e.g. phosphoric acids and their salts, phosphonic acids and their salts, metal chelating agents, corrosion inhibitors, oxygen scavengers, homo- and copolymers of acrylic acid, homo- and copolymers of maleic acid or anhydride, and acrylic acid/maleic acid based polymers.

The invention can best be understood by reference to the following examples, in which the invention is presented in greater detail. The examples are not, however, to be construed to limit the invention herein in any manner, the scope of which is defined by the appended claims.

EXAMPLES

Polymers were made in accordance with the following examples:

Example 1. Poly(acrylamide)

A 100 mL, 3-neck flask was fitted with a septum, paddle stirrer, condenser/gas bubbler, and heater/controller. The argon-purged flask was charged with 6.87 g (0.114 mol) of argon-purged isopropanol and 56 mL of argon-purged water. The stirred solution was heated to 80° C. and 0.956 g of a 52% aqueous acrylamide solution was injected followed by 0.050 g of potassium persulfate in 1 mL of water. This was immediately followed by 9.85 g of 52% aqueous acrylamide metered by syringe pump over a period of 10 minutes. The solution was stirred for an additional 25 min, during which time it became slightly turbid. It was cooled, evaporated to dryness, and vacuum dried at 55° C. overnight, giving 6.01 g of hard, clear and colorless poly(acrylamide), 94%.

Example 2. Poly(N,N-dimethylacrylamide)

To a 250 mL, 3-neck flask, fitted with a stir bar, argon inlet, water-cooled condenser/gas bubbler,. septum, and a controller/heater, was charged 9.33 g (0.0942 mol) of N,N-dimethylacrylamide and 150 mL of isopropanol. The system was purged with argon, and the stirred solution was heated to 80° C. A solution comprising 0.0168 g of AIBN/mL of isopropanol was delivered by syringe pump at 0.131 mL/min over a 137 min period. The reaction mixture was cooled, concentrated on a rotary evaporator to approximately one-fourth of its volume, then precipitated from 500 mL of hexane. Upon standing for 2 hr, the nearly clear hexane phase was decanted-off. The polymer was air dried, then vacuum dried at 55 ° C. overnight, producing a rigid foam, 7.6 g, 82%.

Example 3. Poly(N-methyl-N-vinylacetamide), Poly(N-acryloyl pyrrolidine) and Poly(N-methylacrylamide)

These polymers are prepared as described above for poly(N,N-dimethyl acrylamide) in isopropanol with equimolar substitution of monomer.

Example 4. n-Octadecylthio-Terminated Poly(N,N-dimethylacrylamide)

The process for making poly(N,N-dimethyl acrylamide) was followed except that the flask was charged with 9.78 g (0.0987 mol) of N,N-dimethylacrylamide, 0.3603 g (1.26 mmol) of octadecyl mercaptan, 1.0 mL of chlorobenzene (internal GC or gas chromatograph standard), and 75 mL of toluene. The system was purged with argon, and a GC sample was taken. The stirred solution was then heated to 80° C. A total of 2.78 g of a solution comprising 0.0872 g of AIBN, 1.1086 g of octadecyl mercaptan, and 10 mL of toluene was delivered by syringe pump over a period of 25 min (0.13 mL/min). The conversion of monomer and octadecyl mereaptan was monitored by GC, reaching 61% of N,N-dimethylacrylamide and 89% of the total mercaptan. The reaction mixture was cooled, concentrated on a rotary evaporator to 16 g, then precipitated from 500 mL of ether. A fine, white powder was recovered, which was vacuum dried overnight, giving 5.94 g (90%) of polymer. A similar procedure can be used to prepare other lower alkylthio-terminated poly(N,N-dimethylacrylamide).

Example 5. Poly(2-ethyl-2-oxazoline) by Solution Polymerization

A 100 mL, 3-neck flask, fitted with a water-cooled condenser, gas bubbler, argon inlet, stirrer, and rubber septam, was charged with 10.0 g (0.101 mol), of sieve-dried 2-ethyl-2-oxazoline, 0.5486 g (2.946 mmol) of methyl tosylate, and 60 mL of sieve-dried acetonitrile. The stirred solution was purged with nitrogen for 5 min, and 1 mL of chlorobenzene (internal GC std) was injected. A GC sample was taken and the stirred mixture heated to 80° C. GC samples were periodically removed to measure fractional conversion, which reached 82% in 6.0 hr. The system was allowed to cool to room temperature and the conversion was found to be 97% after 22 hr. The reaction mixture was precipitated from ether, to give a white solid having a taffy-like consistency. It was vacuum dried at 55 ° C. overnight, producing a rigid foam. Theoretical degree of polymerization (DP) was 34. H-NMR performed in $CDCl_3$, 500 MHz, 296° K., gives number average DP 34 based on N-acetyl $CH_3$, δ1.12, and tosylate ortho H, δ7.68. Polymers having various DP's were prepared in this way with corresponding changes in the monomer/initiator ratio.

Example 6. Poly(2-ethyl-2-oxazoline) by Bulk Polymerization

A flame-dried, 10 mL serum bottle was charged with 0.2484 g (0.00134 mol) of methyl rosylate in a nitrogen-filled glove bag. The bottle was capped, and 4.87 g (0.0491 mol) of sieve-dried 2-ethyl-2-oxazoline was injected under argon. The head-space was then evacuated, and the bottle placed in a stirred oil bath at 100 ° C. for 1 hr. Upon cooling, the hard solid was recovered by dissolving it in acetonitrile followed by vacuum drying, to give 5.07 g of solid polymer, 99%, theoretical DP 37. Polymers having higher DP's were prepared in this way with corresponding changes in the monomer/initiator ratio. For higher DP polymers, reaction times were extended to 2 hr. Conversions were typically quantitative.

Example 7. Heptadecyl - Terminated Poly(2-ethyl-2-oxazoline)

The equipment used in the bulk polymerization of poly(2-ethyl-2-oxazoline) was used in this synthesis. The serum bottle was charged with 0.0747 g (0.402 mmol) of methyl tosylate and 0.1778 g (0.568 mmol) of2-heptadecyl-2-oxazoline and was warmed to 45 ° C. to melt the monomer and obtain a homogeneous mixture. It was then placed in an oil bath at 100 ° C. for 15 min. to prepare the living prepolymer. The bottle was removed, cooled, and 3.94 g (0.0395 mol) of sieve-dried 2-ethyl-2-oxazoline was injected. The mixture was warmed to 40° C. to dissolve the prepolymer, and the bottle was returned to the oil bath at 100° C. for 2 hr. A resinous polymer was produced and quantitatively recovered with chloroform. Vacuum drying at 55° C. overnight, gave 4.37 g (104%) of a rigid foam. The theoretical DP is 100, with an average 1.4 end-groups/chain. Variations in DP and average number of end groups can be obtained through appropriate changes in the monomer/initiator ratio and the ratio of the two oxazoline monomers.

Example 8. Octadecyl - Terminated Poly(2-ethyl-2-oxazoline)

The bulk polymerization method described for poly(2-ethyl-2-oxazoline) above was repeated replacing methyl tosylate with octadecyl tosylate. The charge comprised 4.82 g (0.0486 mol) of 2-ethyl-2-oxazoline, and 0.1998 g (0.471 mmol) of octadecyl tosylate.

Several examples of tertiary-amide polymers were prepared in order to rank their performance as silica inhibitors and dispersants and to compare them with commercial materials. The vinyl polymers were made by a convention free radical method in the presence of isopropanol, an efficient chain transfer agent, in order to obtain nominally similar molecular weight polymers. Commercial materials having high molecular weights are available.

The polymers were evaluated for their ability to stabilize remarkably high levels of soluble silica in water, based on the yellow silicomolybdic acid test for soluble silica set forth in R. K. Iler, "The Chemistry of Silica", 1979, John Wiley, New York, page 95. The test measures the ability of a polymer to inhibit the polymerization of silica in a solution containing soluble silica (sodium silicate), calcium ion ($Ca^{2+}$), magnesium ion ($Mg^{2+}$) and chloride ion ($Cl^-$) at pH 7 and at 40° C. To perform this test, three aqueous stock solutions were prepared comprising 0.20M $Na_2SiO_3$, a combination of 0.2M $CaCl_2$ and 0.2 M $MgCl_2$, and 1,000 ppm of polymer, in accordance with the present invention. A 200 mL test solution was prepared which contained 0 to 70.0 mL of the polymer solution, 10.0 mL of $Na_2SiO_3$ solution, and 5.0 mL of the $CaCl_2/MgCl_2$ solution, with the volume adjusted to 200 mL with distilled water and the pH adjusted to 7.0. The resulting test solution contains the following concentrations: 600 ppm soluble silica as $SiO_2$, 200 ppm Ca, 120 ppm Mg, and 0 to 350 ppm of polymer. The test solution is placed in a 225 mL wide mouth polyethylene jar containing a 2-hole rubber stopper. One opening is used for a pH probe and the second for sampling. The test solution was stirred with a magnetic stir bar while heated at 40° C. in a circulating bath. The pH was maintained at 7.0±0.1. A 3 to 5 mL sample was periodically removed and passed through a 0.22 μm filter. A 2.00 mL sample of the filtrate was diluted to 25 mL with distilled water. The contents of one pillow of Molybdate Reagent for high range silica is added (Hach Co., Loveland, Colo., see Hach Water Analysis Handbook, 1989, p. 546) and the mixture stirred for 10 min. This was followed by one pillow of Acid Reagent for high range silica. The absorbance of the sample was measured at 450 nm. The reduction in soluble silica is based on the decrease in absorbance relative to the absorption obtained for the test solution immediately following its preparation.

The decline in soluble silica is measured with time, specifically at 0, 1, 5 and 22 hr. The yellow compound formed between the molybdate reagent and monomeric silicic acid/silicate forms quantitatively, and the color intensity, as measured by absorbance at 450 nm, is proportional to the amount of soluble silica present in the test solution. Absorbance is measured with a spectrophotometer.

In addition to measuring the ability of the polymers to inhibit the polymerization of silica, tests were made to determine the ability of the polymers to disperse the silica produced in the test solution. In order to measure this aspect of the invention, a dispersancy test, which is a modified opacity or turbidity test, was performed using a Brinkman PC-800 colorimeter. In this test, the percent light transmission through the test solution is periodically measured one inch below the surface. Two values are reported in this test. The first value is measured immediately after stirring is stopped, while the second measurement is made after the solution has remained unstirred for 10 min. The colorimeter was operated in accordance with its standard procedure, with a 420 nanometer filter and a 1 centimeter path length cell. The colorimeter was calibrated with deionized water.

The results of these tests, applied to various tertiary amide polymers at 350 ppm and various controls, are reported in Table I. The data shows the amounts of silica present at each time period, the percentage (by weight) decline in the soluble silica in the test solution after 5 and 22 hr, and turbidity.

TABLE I

Silica Inhibition With Tertiary-Amide Polymers

| Example No. | Polymer Additive | Soluble Silica (ppm) | | | | Decline in Soluble Silica (%) | | Turbidity (% Transmission) | |
|---|---|---|---|---|---|---|---|---|---|
| | | 0 Hr | 1 Hr | 5 Hr | 22 Hr | 5 Hr | 22 Hr | 5 Hr | 22 Hr |
| Controls: | | | | | | | | | |
| 1 | None | 575 | 461 | 261 | 200 | 55 | 65 | 98/98 | 82/84 |
| 2 | Poly(acrylamide) | 618 | 392 | Terminated | — | >>37 | — | — | — |
| 3 | Poly(N-methylacrylamide) | 598 | 487 | 315 | 240 | 47 | 60 | — | — |
| 4 | Poly(N-methyl-N-vinylacetamide) | 613 | 570 | 447 | 321 | 27 | 48 | — | — |
| Poly(N,N-disubstituted acrylamide); Polymer I: | | | | | | | | | |
| 5 | Poly(N,N-dimethylacrylamide) | 578 | 587 | 544 | 401 | 5.9 | 31 | 78/98 | 34/53 |
| 6 | Poly(N-acryloylpyrrolidine) | 521 | 507 | 467 | 404 | 10 | 22 | — | — |
| 7 | $A = CH_3(CH_2)_2S$ | 567 | 530 | 530 | 487 | 6.5 | 15 | 57/70 | 45/63 |
| 8 | $A = CH_3(CH_2)_5S$ | 601 | 553 | 535 | 512 | 11 | 15 | 55/78 | 42/68 |
| 9 | $A = CH_3(CH_2)_{11}S$ | 581 | 590 | 550 | 478 | 5.3 | 19 | 51/77 | 32/56 |
| 10 | $A = CH_3(CH_2)_{17}S$ | 575 | 573 | 535 | 346 | 7.0 | 40 | 96/97 | 69/69 |
| Poly(2-ethyl-2-oxazoline); Polymer II, m = 2, $R_3 = C_2H_5$, X = $CH_3$, Y = ethyl oxazolinium tosylate: | | | | | | | | | |
| 11 | n = 14 (solution) | 561 | 458 | 404 | 349 | 28 | 38 | 32/70 | 25/55 |
| 12 | n = 33 (solution) | 555 | 538 | 521 | 498 | 6.1 | 10 | — | — |
| 13 | n = 37 (bulk) | 555 | 553 | 550 | 510 | 0.9 | 8.1 | 73/83 | 59/68 |
| 14 | n = 62 (solution) | 578 | 555 | 544 | 521 | 5.9 | 10 | 58/72 | 49/81 |
| 15 | n = 72 (bulk) | 581 | 578 | 564 | 510 | 2.9 | 12 | — | — |
| 16 | n = 105 (solution) | 587 | 584 | 558 | 510 | 4.9 | 13 | 67/84 | 52/73 |
| 17 | n = 238 (bulk) | 550 | 527 | 487 | 384 | 11 | 30 | 69/97 | 34/69 |
| 18 | n = 580 (bulk) | 555 | 550 | 504 | 407 | 9.2 | 27 | 77/98 | 44/78 |
| 19 | n = 500 (Aldrich, "MW 50k") | 581 | 538 | 521 | 412 | 10 | 29 | — | — |
| Poly(2-ethyl-2-oxazoline); Polymer II, m = 2, $R_3 = C_2H_5$, X = $C_{18}H_{37}$, Y = ethyl oxazolinium tosylate: | | | | | | | | | |
| 20 | n = 34 | 541 | 510 | 441 | 318 | 18 | 41 | 86/86 | 60/98 |
| 21 | n = 103 | 581 | 567 | 475 | 298 | 18 | 49 | 98/98 | 62/96 |
| 22 | n = 219 | 578 | 575 | 495 | 140 | 14 | 76 | 98/99 | 72/100 |
| Poly(2-ethyl-2-oxazoline); Polymer II, m = 2, $R_3 = C_2H_5$, $X = CH_3-[-N(COC_{17}H_{35})-CH_2CH_2-]_p-$, Y = ethyl oxazolinium tosylate: | | | | | | | | | |
| 23 | p = 1.4; n = 100 | 522 | 530 | 517 | 431 | 1 | 17 | 98/98 | 84/84 |
| 24 | p = 2.4; n = 100 | 531 | 528 | 520 | 439 | 2 | 17 | 86/88 | 63/69 |
| 25 | p = 1.0; n = 50 | 513 | 537 | 496 | 410 | 3 | 20 | 97/97 | 58/76 |
| 26 | p = 1.7; n = 50 | 538 | 541 | 502 | 429 | 7 | 20 | 76/87 | 48/54 |

As can be seen from the results in Table I, the polymers in accordance with the present invention are very effective in preventing the polymerization of soluble silica, especially when compared to the control (no polymer) and with amide-containing polymers which do not have a fully substituted nitrogen atom. Examples 2 and 3 are poly(acrylamide)s which are unsubstituted and monosubstituted, respectively. Activity is lost with monosubstitution, which results in a 60% reduction in soluble silica over 22 hr, comparable to the control with no polymer. The unsubstituted polyacrylamide of Example 2 actually accelerates silica polymerization as compared to the control with no polymer, producing a 37% reduction in soluble silica in just one hour. However, the tertiary-amide polymers of the present invention provide substantial inhibition, with the 22 hr decline in soluble silica ranging from 8.1 to 48%. Moreover, the introduction of a long chain alkyl end group improves dispersancy. This affect is evident when comparing the turbidity data for the short chain polymers, Examples 7 through 9, with the n—$C_{18}H_{37}$ end capped polymer, Example 10, and also when comparing the $CH_3$ end capped polymers, Examples 13 and 16, with the corresponding n—$C_{18}H_{37}$ end capped polymers, Examples 20 and 21, and the n—$C_{17}H_{35}$ end capped polymers, Examples 23 to 25.

Table II, Examples 31 to 38, demonstrates that poly(2-ethyl-2-oxazoline) provides measurable inhibition of silica polymerization at levels as low as 15 ppm with an initial soluble silica concentration of 600 ppm. However, at 400 ppm of soluble silica, 15 ppm of poly(2-ethyl-2-oxazoline) completely supresses silica polymerization over a 234 hr. test period, far exceeding the control (Table III).

The test results in Table IV show that the polymers of the present invention can be combined with certain known polymer additives, or costabilizers, for enhanced performance, as well as other chemicals or polymers to control or inhibit corrosion or mineral scales, such as alkaline earth metal carbonates, sulfates, and phosphates, to disperse suspended matter, such as iron oxides and clay, and to stabilize metal ions, such as iron, zinc, and manganese, and provide other water treatment benefits. Examples of these costabilizers include acrylic acid-containing acrylate terpolymers, such as GOOD-RITE® K-798 and K-XP70, acrylic acid-containing acrylate copolymers, such as GOOD-RITE® K-775, and acrylic acid-containing acrylate homopolymers, such as GOOD-RITE® K-752, all of which are available from The B.F.Goodrich Company, as well as acrylate copolymers, such as Acumer® 5000, which is available from Rohm and Haas, and polymaleic acid polymers, such as Belclene® 200, which is available from FMC Corporation, or combinations of these with other known water treatment chemicals. The costabilizer of Example 51 is a blend of 20 ppm of GOOD-RITE® K-798 with 5 ppm of tolyltriazole, a known corrosion inhibitor, and 9 ppm of hydroxyethylidene-1,1-diphosphonic acid (HEDP) and 4 ppm of 2-phosphonobutane-1,2,4-tricarboxylic acid (PBTC), which are known corrosion or calcium carbonate scale inhibitors, with the pH adjusted to 9 with KOH. This K-798 blend is an example of a product which might be used for a general purpose water treatment. Example 34, which is the use ofpoly(2-ethyl-2-oxazoline) alone at 25 ppm, is presented for comparison. In some cases, the performance of these formulations far exceed that of 25 ppm of poly(2-ethyl-2-oxazoline) alone with respect to both silica inhibition and dispersancy, such as Examples 51 and 56. The costabilizers, themselves, have little or no stabilizing activity toward the inhibition of silica polymerization, as can be

TABLE II

Silica Inhibition with Varying Concentrations of Poly(2-ethyl-2-oxazoline), DP 63*, in Test Water Containing 600 ppm of Soluble Silica

| Example No. | Polymer Amount (ppm) | Soluble Silica (ppm) | | | | Decline in Soluble Silica (%) | | Turbidity | |
|---|---|---|---|---|---|---|---|---|---|
| | | 0 Hr | 1 Hr | 5 Hr | 22 Hr | 5 Hr | 22 Hr | 5 Hr | 22 Hr |
| 1 | none | 557 | 461 | 261 | 200 | 55 | 65 | 98/98 | 82/84 |
| 31 | 350 | 578 | 555 | 547 | 521 | 5.4 | 9.9 | 58/72 | 49/81 |
| 32 | 175 | 548 | 541 | 508 | 491 | 7.3 | 10 | 75/84 | 60/71 |
| 33 | 75 | 561 | 541 | 517 | 488 | 7.8 | 13 | 70/80 | 50/62 |
| 34 | 25 | 557 | 534 | 464 | 281 | 17 | 50 | 68/80 | 39/43 |
| 35 | 15 | 533 | 515 | 341 | 206 | 36 | 61 | 67/76 | 51/54 |

*DP = number average degree of polymerization.

TABLE III

Silica Inhibition with Poly(2-ethyl-2-oxazoline), DP 63, In Test Water Containing 400 ppm of Soluble Silica

| Example No. | Polymer | Amount (ppm) | Soluble Silica (ppm) | | | | Decline in Soluble Silica (%) | | Turbidity | |
|---|---|---|---|---|---|---|---|---|---|---|
| | | | 0 Hr | 90 Hr | 168 Hr | 234 Hr | 90 Hr | 168 Hr | 90 Hr | 234 Hr |
| 41 | none | none | 397 | 262 | 236 | — | 34 | 41 | 81/84 | — |
| 42 | Poly(2-ethyl-2-oxazoline) | 15 | 373 | 368 | 362 | 368 | 1.3 | 1.3 | 100/100 | 100/100 | seen from Examples 59 and 60, as compared to the inhibitor-free control, Example 1 of Table I.

plated. It is intended that the invention be defined by the following claims.

TABLE IV

Performance of Formulations Containing 25 ppm of Poly(2-ethyl-2-oxazoline)*, DP 77, and Costabilizers at 600 ppm Soluble Silica

| Example | Formulation | | Soluble Silica (ppm) | | | | Decline in Soluble Silica (%) | | Turbidity | |
|---|---|---|---|---|---|---|---|---|---|---|
| No. | Costabilizer | Amount (ppm) | 0 Hr | 1 Hr | 5 Hr | 22 Hr | 5 Hr | 22 Hr | 5 Hr | 22 Hr |
| 34 | None | 0.0 | 557 | 534 | 464 | 281 | 17 | 50 | 68/80 | 39/43 |
| 51 | GOOD-RITE ® K-798 + Tolyltriazole + HEDP + PBTC | 20 + 5 + 9 + 4 | 533 | 520 | 534 | 488 | 0.0 | 8.4 | 82/90 | 65/72 |
| 52 | GOOD-RITE ® K798 | 24 | 531 | 522 | 521 | 481 | 1.9 | 9.4 | 84/88 | 67/76 |
| 53 | GOOD-RITE ® K-XP70 + GOOD-RITE ® K-798 | 20 + 20 | 544 | 535 | 517 | 518 | 4.8 | 4.8 | 78/84 | 68/71 |
| 54 | GOOD-RITE ® K-752 + Belclene 200 | 27 + 32 | 537 | 533 | 306 | 210 | 43.0 | 60.9 | | |
| 55 | GOOD-RITE ® K-775 | 25 | 525 | 531 | 467 | 313 | 11.0 | 40 | 74/83 | 72/79 |
| 56 | GOOD-RITE ® K-XP70 | 25 | 530 | 522 | 511 | 485 | 3.6 | 8.5 | 86/89 | 71/80 |
| 57 | Acumer-5000 | 25 | 534 | 527 | 507 | 234 | 5.1 | 56 | 82/88 | 86/88 |
| 58 | Belclene 200 | 25 | 529 | 523 | 487 | 219 | 7.8 | 59.4 | 80/86 | 57/63 |
| 59 | GOOD-RITE ® K-798* | 25 | 573 | 338 | 238 | — | 58.5 | — | — | — |
| 60 | GOOD-RITE ® K-798* | 50 | 598 | 418 | 240 | — | 59.7 | — | — | — |

*The noted formulations do not contain Poly(2-ethyl-2-oxazoline).

As can be seen, the polymers of the present invention have excellent performance as silica inhibitor or dispersants, either alone or in combination with known water treatment additives. The precise effective dosages at which they are employed will vary depending upon the makeup of the water that is being treated. An effective dosage will usually be in the range of 0.5 to 500 ppm, with the dosage in the range of 1 to 100 ppm being preferred since the higher the dose, the higher will be the cost, with 5 to 50 ppm being another preferred range. These dosages are typical for water treatment additives.

The polymers of the present invention are excellent threshold silicate precipitation inhibitors, but they also can be designed to stabilize, disperse, and solubilize silica and silicates. Further, the polymers of the present invention could be combined with a variety of other water treatment chemicals or compositions, including surfactants, phosphonates and their salts, substituted phosphonates and their salts, other phosphonic acids and their salts, phosphoric acids, metal chelating agents, oxygen scavengers, and other scale inhibiting agents. Thus, the polymers of the present invention are useful in a wide variety of aqueous systems, including, but not limited to, cooling water systems, boiler water systems, desalination systems, gas scrubber water systems, blast furnace water systems, reverse osmosis water systems, evaporator systems, paper manufacturing systems, mining systems, geothermal applications and the like.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What we claim is:

1. A method of inhibiting the formation and deposition of silica and silicate compounds in water systems comprising adding to the water in a water system an effective mount of a polymer or copolymer consisting essentially of the following structure:

    (I)

or

    (II)

wherein A is an initiator radical from free radical polymerization, where said initiator radical is formed from an initiator selected from the group consisting of peroxide initiators, azonitrile initiators, and initiators from transfer agents, $R_1$ and $R_2$ are alkyl groups which contain a combined total of 2–4 carbon atoms or $R_1$ and $R_2$ together with the nitrogen atom comprise a ring containing 3 to 5 carbon atoms, $R_3$ is either H or $C_1$ to $C_4$ alkyl, X is selected from the group consisting of hydrogen, an alkyl or aralkyl chain containing up to 30 carbon atoms, and substituted or unsubstituted benzyl, and Y is an oxazolinium salt, a 1,3-oxazinium salt, or an end group selected from the group consisting of halogens, hydroxyl, acyloxy, alkoxy, aralkoxy, alkylthio, aralkylthio, or carboalkoxyalkylthio, alkyl or aralkylammonium, or alkyl or aralkylamine, where the alkyl groups in Y comprise straight or branched chains of up to 30 carbon atoms, m is 2 or 3, and n is an integer between 10 and 1000.

2. The method of claim 1 wherein A has the following formula:

where y is 17 and $R_1=R_2=CH_3$.

3. The method of claim 1 wherein A is selected from the group consisting of alkoxy, acyloxy, hydroxyl, sulfonate, cyanoalkyl, alkyl, hydroxyalkyl, alkylthio, aralkylthio, carboalkoxyalkylthio, and tetrahydrofuranyl radical groups.

4. The method of claim 1 wherein Y is an oxazolinium salt having the following formula:

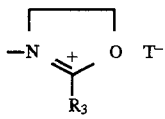

wherein T is selected from the group consisting of p-toluenesulfonate, $CH_3SO_3$, $ClO_4$, $PF_6$, and $BF_4$.

5. The method of claim 1 wherein said polymer II has the following formula:

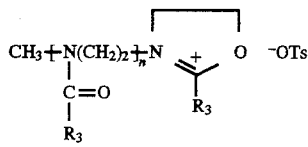

wherein $R_3$ is H or an alkyl group having 1 to 4 carbon atoms, and n is an integer between 10 and 1000.

6. The method of claim 5 wherein $R_3$ is ethyl.

7. The method of claim 1 wherein said polymer I has the following formula:

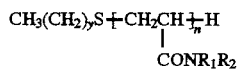

wherein $R_1$ and $R_2$ are alkyl groups having a combined total of 2 to 4 carbon atoms, y is an integer between 0 and 30, and n is an integer between 10 and 1000.

8. The method of claim 6 wherein $R_1$ and $R_2$ are methyl groups.

9. The method of claim 8 wherein y=17.

10. The method of claim 1 wherein n is between 20 and 100.

11. The method of claim 1 wherein n is between 30 and 70.

12. The method of claim 1 wherein said polymer I is an alkylthio-terminated poly(dimethylacrylamide).

13. The method of claim 1 wherein $R_3$ is $C_2H_5$, Y is ethyl oxazolinium tosylate, and X is n-octadecyl.

14. The method of claim 1 wherein X is

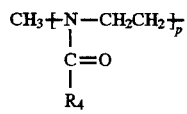

p is 1 to 3, $R_4$ is $C_rH_{2r+1}$, and r is 5 to 30.

15. The method of claim 1 wherein formula II is a random or block copolymer where $R_3$ is a combination of $C_2H_5$ and $C_rH_{2r+1}$, r is 0 to 30, and the copolymer is soluble in water to a degree necessary to inhibit the polymerization of silica.

16. The method of claim 1 wherein the polymer of formula I is a random or block copolymer having random, segments or block segments wherein for some of the segments, $R_1=R_2=$methyl, and for the remainder, $R_1$ and $R_2$ contain a combined total of 4 to 30 carbon atoms, and where the copolymer is soluble in water to a degree necessary to inhibit the polymerization of silica.

17. The method of claim 1 wherein Y is selected from the group consisting of $C_rH_{2r+1}NH_2^+$, $C_rH_{2r+1}NH$, $C_rH_{2r+1}S$, $C_rH_{2r+1}CO_2$, $C_rH_{2r+1}O_2C(CH_2)_mS$, and $CH_3O-(CH_2CH_2CH_2O)_x-$, where m=1 or 2, r=12 to 30 and x=1 to 500.

18. The method of claim 1 wherein $X=CH_3$, $Y=C_rH_{2r+1}NH_2^+$, and r=12 to 30.

19. The method of claim 1 wherein $X=CH_3$, $Y=C_rH_{2r+1}NH$, and r=12 to 30.

20. The method of claim 1 wherein $X=CH_3$, $Y=C_rH_{2r+1}S$, and r=12 to 30.

21. The method of claim 1 wherein $X=CH_3$, $Y=C_rH_{2r+1}CO_2$, and r=12 to 30.

22. The method of claim 1 wherein $X=CH_3$ and $Y=CH_3O-(CH_2CH_2O)_x-$, where x=1 to 500.

23. The method of claim 1 wherein $X=CH_3$ and $Y=C_rH_{2r+1}O_2C(CH_2)_mS$, where m=1 or 2, and r=12 to 30.

24. The method of claim 1 wherein the polymer of formula II contains segments having nominally alternating runs of $[NCOR_3(CH_2)_m-M]$, where M is selected from the group consisting of $CO(CH_2)CO_2$, $COCH=CHCO_2$, $CH_2CH_2CO_2$, $CH_2CH_2CH_2CH_2O$, $CH_2CH_2CH_2SO_2NH$,

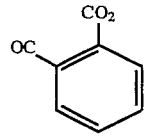

and

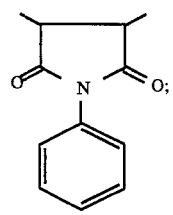

25. The method of claim 1 wherein a mixture of said polymer or copolymer is added to the water.

26. The method of claim 1 wherein said polymer is combined with an effective amount of an acrylic homo- or copolymer costabilizer containing acrylic acid and/or maleic acid whereby mineral scale is inhibited in the water system.

27. The method of claim 1 wherein said polymer or copolymer are combined with an effective amount of polymaleic acid or anhydride costabilizer whereby mineral scales are inhibited in the water system.

28. The method of claim 1 wherein said polymer or copolymer are combined with an effective amount of corrosion inhibitor whereby corrosion inhibition is provided in the water system.

29. The method of claim 1 wherein said polymer or copolymer are combined with an effective amount of a phosphonate whereby mineral scale inhibition and corrosion inhibition are provided in the water system.

30. The method of claim 1 wherein said polymer or copolymer are combined with effective amounts of polymer costabilizers, metal chelating agents, oxygen scavengers, suspending aids, and corrosion inhibitors whereby dispersion of suspended matter and mineral scale, stablization of metal ions, and corrosion inhibition are provided in the water system.

* * * * *

UNITED STATES PATENT AND TRADEMARK OFFICE
CERTIFICATE OF CORRECTION

PATENT NO. : 5,658,465
DATED : August 19, 1997
INVENTOR(S) : Paul Peter Nicholas and Zahid Amjad It is certified that error appears in the above-identified patent and that said Letters Patent is hereby corrected as shown below:

In claim 1, column 12, line 33, change the word "mount" to --amount--.

In claim 17, column 14, lines 3 and 4, change the phrase after "and" to read --$CH_3O-(CH_2CH_2O)_x-$,--.

In claim 24, column 14, line 22, change the phrase "$CH_2CH_2CO_2$, $CH_2CH_2CH_2CH_2O$, $CH_2CH_2CH_2SO_2NH$," to read --$CH_2CH_2CO_2$, $CH_2CH_2CO_2CH_2CH_2O$, $CH_2CH_2SO_2NH$,--.

Signed and Sealed this

Third Day of February, 1998

Attest:

BRUCE LEHMAN

Attesting Officer

Commissioner of Patents and Trademarks